Sept. 30, 1930.  I. H. ATHEY  1,776,846
BRAKE FOR VEHICLES
Filed Jan. 11, 1923  4 Sheets-Sheet 1
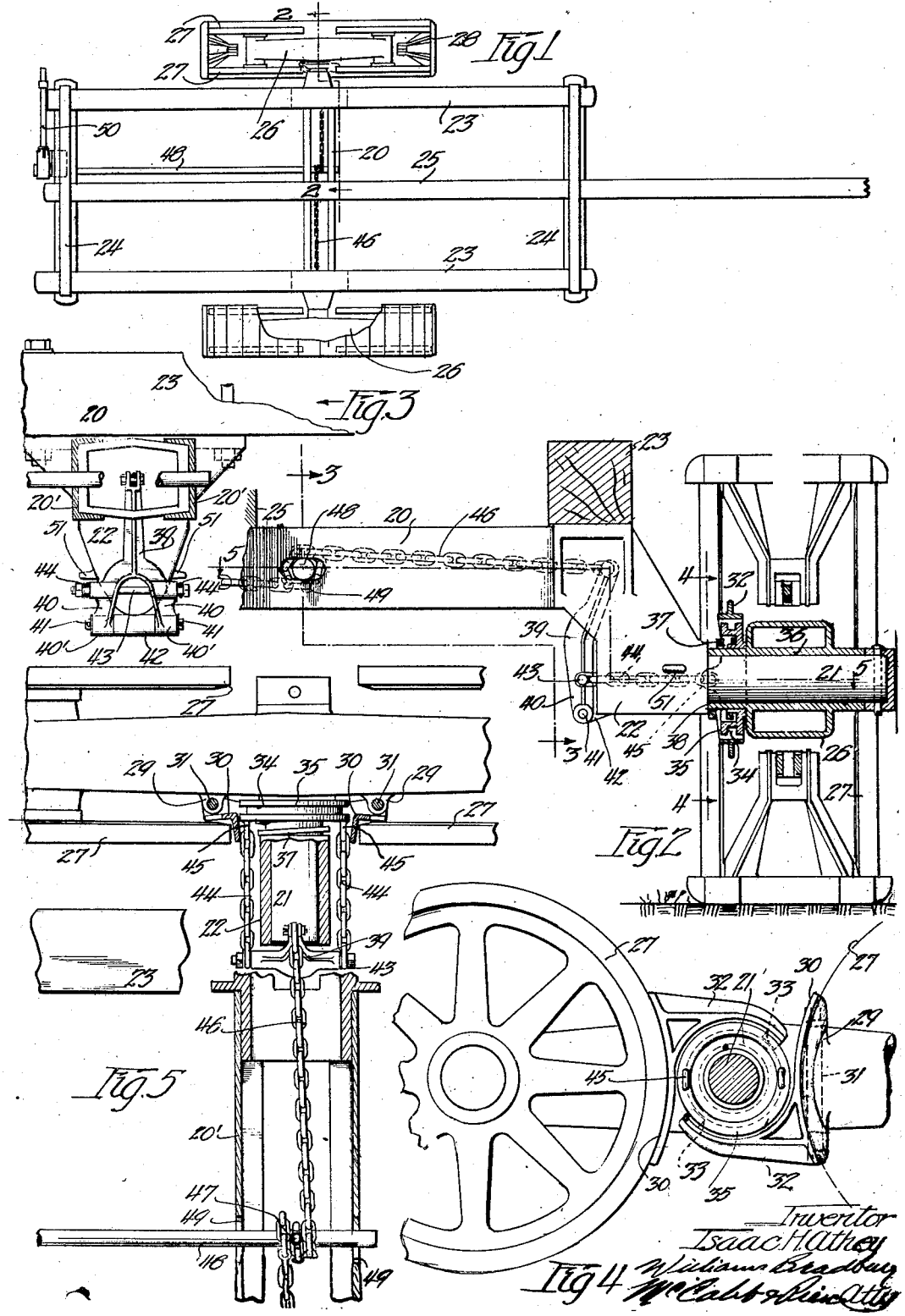

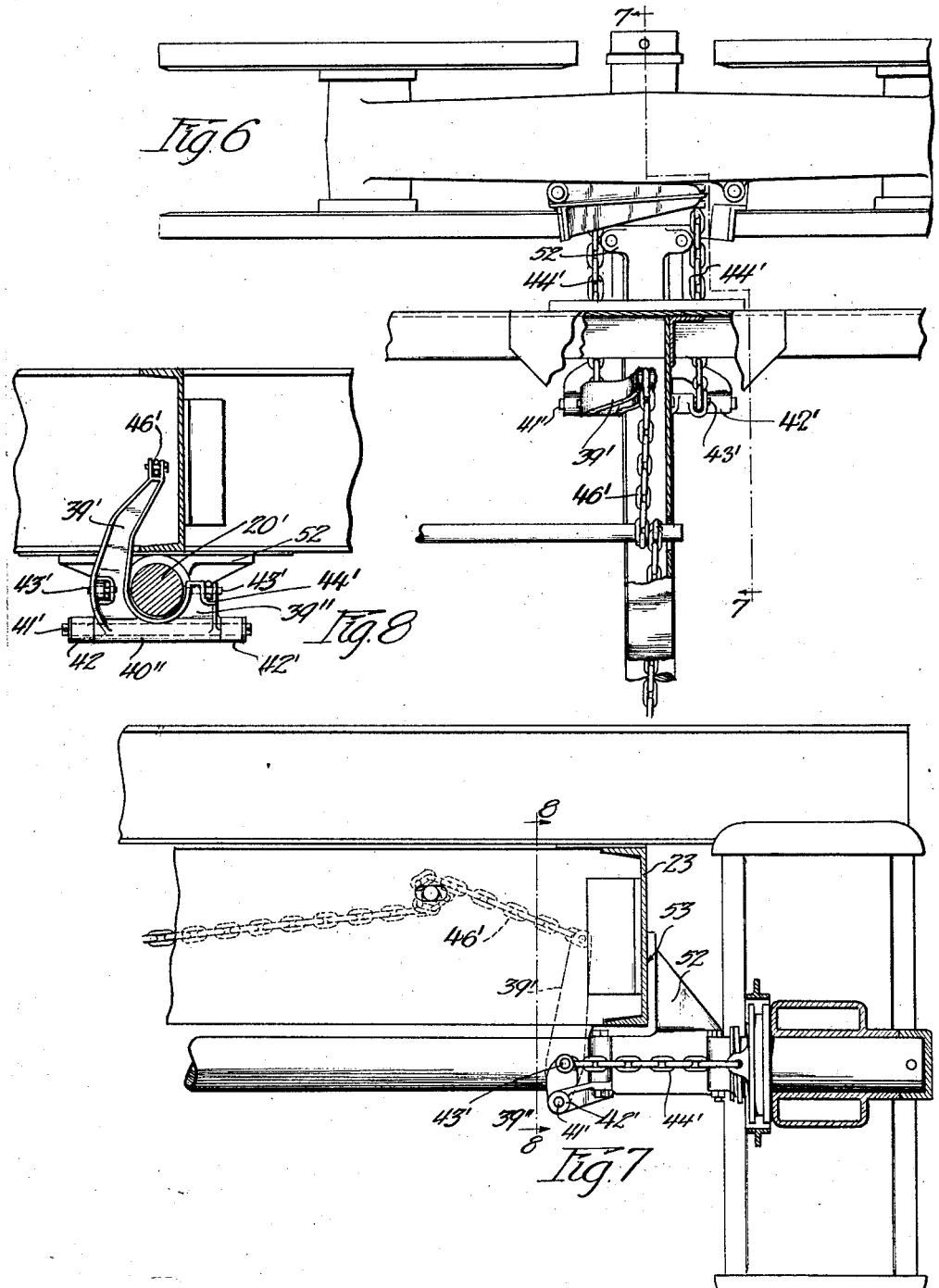

Sept. 30, 1930.  I. H. ATHEY  1,776,846
BRAKE FOR VEHICLES
Filed Jan. 11, 1923   4 Sheets-Sheet 3
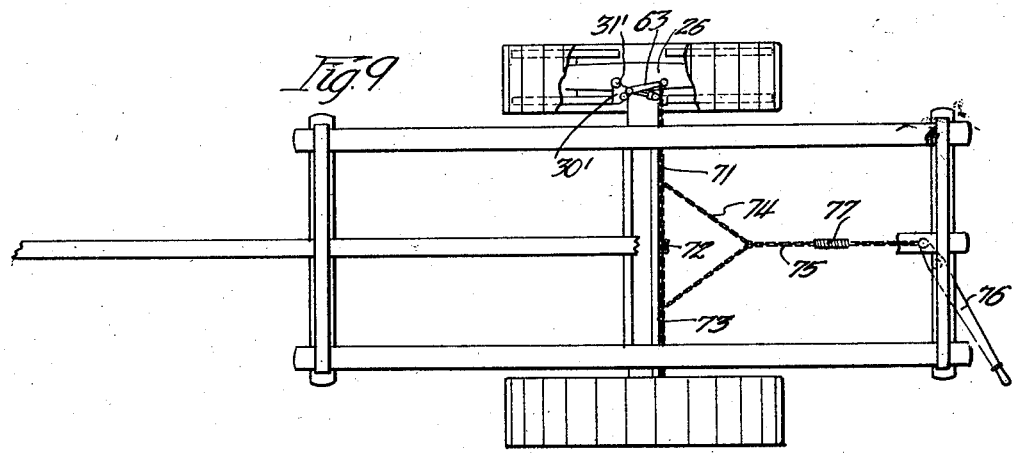
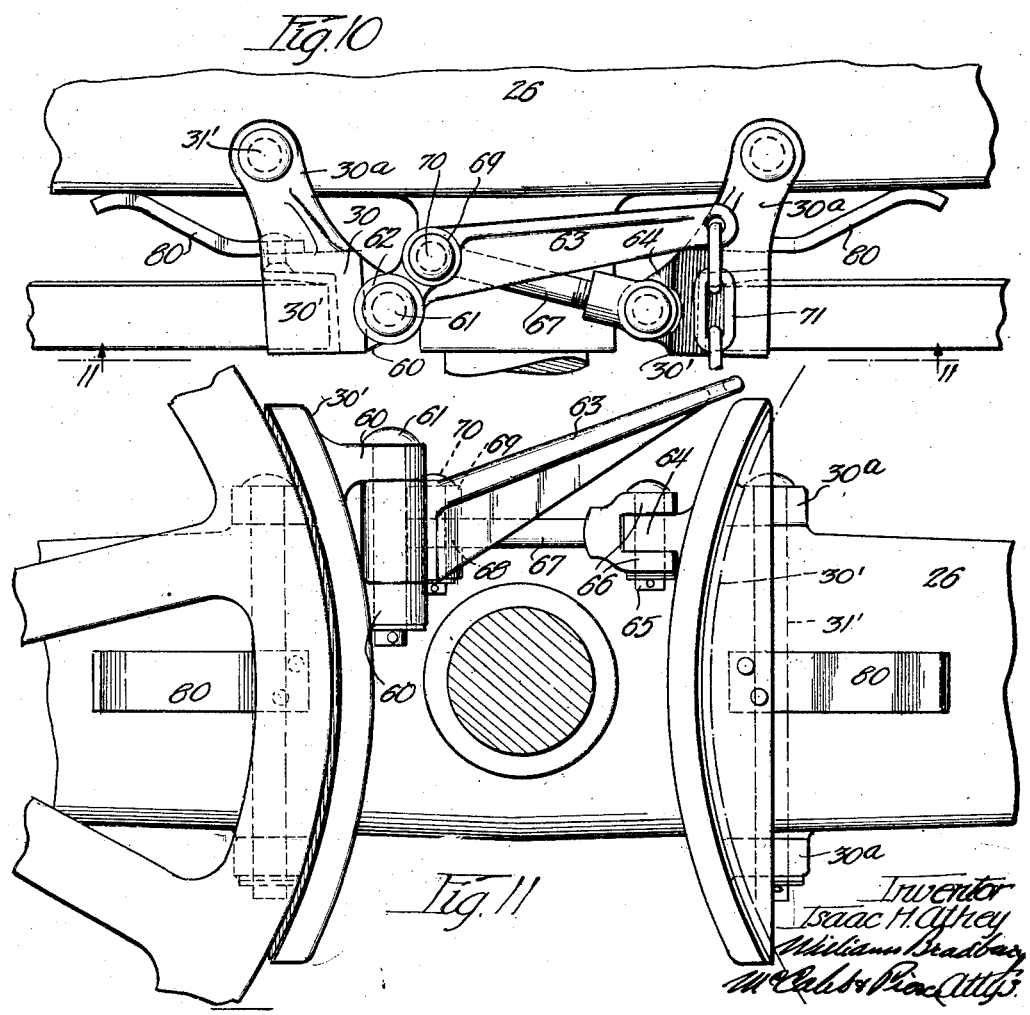

Sept. 30, 1930.  I. H. ATHEY  1,776,846
BRAKE FOR VEHICLES
Filed Jan. 11, 1923  4 Sheets-Sheet 4
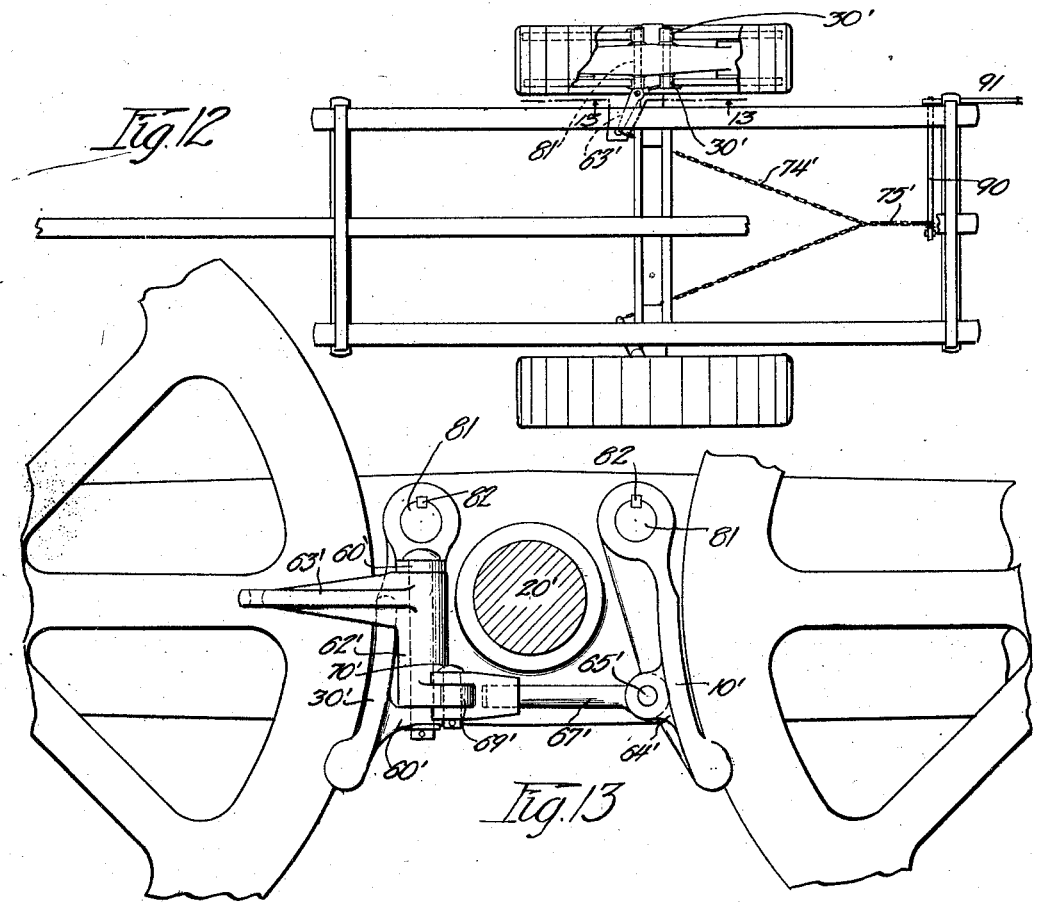
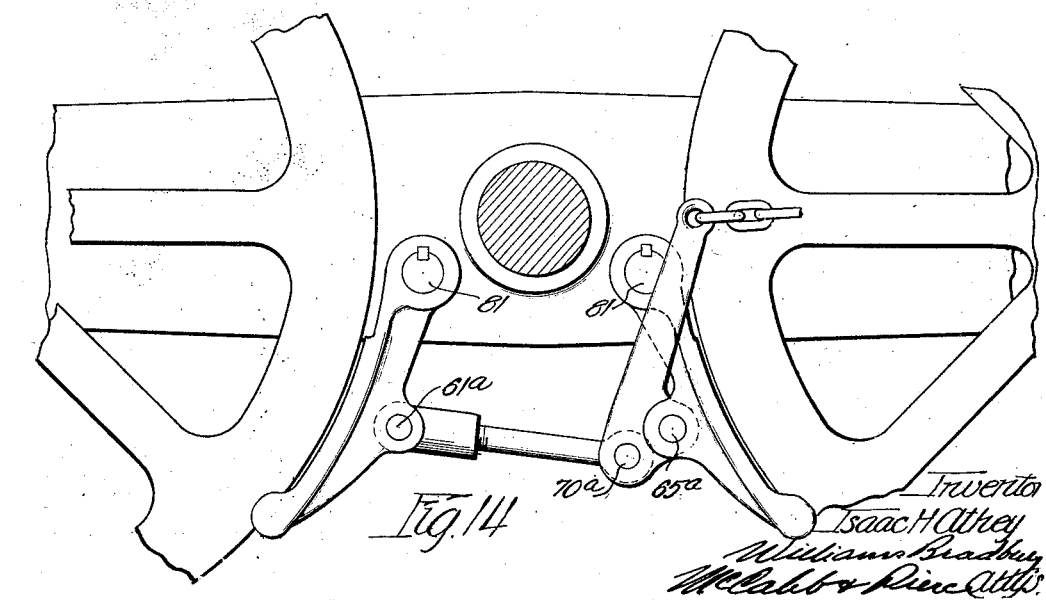

Patented Sept. 30, 1930

1,776,846

UNITED STATES PATENT OFFICE

ISAAC H. ATHEY, OF CHICAGO, ILLINOIS, ASSIGNOR TO ATHEY TRUSS WHEEL CO., OF CHICAGO, ILLINOIS, A CORPORATION OF ILLINOIS

BRAKE FOR VEHICLES

Application filed January 11, 1923. Serial No. 612,012.

My invention relates to improvements in brakes for vehicles, and is particularly concerned with, but not limited to, the provision of brake mechanism for vehicles of that type in which the load supporting wheels roll upon endless tracks or track chains.

The objects of my invention are

First: To provide a vehicle with a brake mechanism that can be easily and quickly operated;

Second: To provide a brake mechanism particularly adapted to vehicles in which the load supporting wheels roll upon an endless track or track chain, which passes around the load supporting wheels;

Third: To provide a brake mechanism of the character described, in which the load supporting wheels are mounted upon opposite ends of a beam, which is pivotally mounted upon the axle;

Fourth: To provide a brake mechanism such as described, which will be operative and remain operative even though the oscillating beams carrying the load supporting wheels should become reversed in their positions, or even turned completely around;

Fifth: To provide a brake mechanism of the character described, in which the operating mechanism is carried by the axle or the load supporting frame;

Sixth: To provide a brake mechanism such as described, which will work equally well with vehicles having straight axles or axles in which the bearing portions are offset from the intermediate portions thereof;

Seventh: To provide a brake mechanism for a vehicle in which a pair of shoes is mounted upon opposite ends of the oscillating beams comprising a brake shoe for each of the wheels, and common means for actuating all of the brake shoes; and Finally: To provide a brake mechanism of the character described, which is simple in construction, economical to manufacture, and easy to operate.

Other objects will appear as this description progresses, reference being had to the accompanying drawings in which Figure 1 is a plan view of a vehicle embodying my invention, certain portions thereof being broken away for the purpose of better illustration;

Figure 2 is a transverse section on an enlarged scale, taken on line 2—2 of Figure 1;

Figure 3 is an enlarged sectional detail, taken on line 3—3 of Figure 2;

Figure 4 is a sectional detail taken on line 4—4 of Figure 2;

Figure 5 is a horizontal sectional detail taken on line 5—5 of Figure 2;

Figure 6 is a fragmentary plan view showing another embodiment of my invention, portions of the vehicle and brake mechanism being broken away;

Figure 7 is a transverse section taken on line 7—7 of Figure 6;

Figure 8 is a sectional detail taken on line 8—8 of Figure 7;

Figure 9 is a plan view of a vehicle embodying another form of my invention;

Figure 10 is a fragmentary plan view thereof;

Figure 11 is a transverse section taken on line 11—11 of Figure 10;

Figure 12 is a plan view of a vehicle embodying another modification of my brake mechanism;

Figure 13 is a transverse section taken on line 13—13 of Figure 12, and

Figure 14 is a view similar to Figure 13, showing another embodiment of my invention.

Throughout the several views, similar reference characters will be used for referring to similar parts, and the several sections are taken looking in the direction of the small arrows.

Referring for the present to Figures 1 to 5 inclusive, wherein I have disclosed one embodiment of my invention, I have illustrated my invention in combination with a vehicle comprising in general an axle 20, having the offset end bearing portions 21 forming the knees 22, to which reference will be made later on, and a load supporting frame here illustrated as comprising the side members 23, end members 24 and reach 25. Mounted upon the offset ends of the axle are the load supporting beams 26 on the opposite ends of which are rotatably mounted a pair of load supporting wheels 27 the wheels at each end of the beam lying upon opposite sides of the ends thereof as shown in Figure 1. An endless track or track chain 28 of any suitable construction, but preferably of the truss chain type passes around the wheels carried by each beam, and forms a supporting surface for the load supporting wheels to roll upon. The central portion of the axle 20 is preferably formed of two channel beams 20', as shown in Figure 3, which are arranged with their webs in vertical planes and their flanges extending toward each other. These channels end in cast steel members forming the bearing portions 21, and the knees 22.

The construction thus far described forms part of my invention only as it enters into combination with the parts to be described.

A lug 29 extends inwardly from each beam on each side of the axle, and provides a support for an angularly shaped brake shoe 30, which is pivotally secured thereto by means of a pin or pintle 31. A lever arm 32 extends from each of the shoes 30, almost to the opposite shoe on the same beam, and ends in a lug 33 which projects into an annular groove 34 formed in a collar 35 carried by the inner end of the hub or bearing 36 of the load supporting beam, and positioned adjacent the inner side of the load supporting beam. A helical spring 37 interposed between the collar and the adjacent shoulder 38 of the axle tends to hold the collar in its outermost position, that is, in the position in which the brakes are released.

For the purpose of moving each of the collars 35 inwardly, I provide a lever 39 for each end of the axle. The lower end of this lever is bifurcated as shown in Figure 3, the bifurcations 40 thereof ending in bearings 40' which are pivotally mounted upon a pin 41, which extends through a suitable bearing lug 42 extending inwardly from the knee 22. A bolt 43 extends through the bifurcations of the lever intermediate the ends of the lever and the inner end of a chain 44 is secured to each of the projecting ends of the bolt 43. The other ends of these chains are connected with lugs 45 extending inwardly from the collar 35.

The upper ends of the levers 39 project upwardly between the beams 20' forming the central portion of the axle, and are connected by chains 46 and a bolt 47 with the periphery of a shaft 48, which is rotatably mounted in slots 49 in the webs of the beams 20', and in a suitable bearing in the end member 24. A lever 50 is connected with the rear end of the shaft 48 by means of ratchet mechanism which will permit the shaft 48 to be rotated in either direction by oscillatory movement of the shaft 50, and means are also provided for holding the shaft 48 in such a position as to hold the chains 46 under tension.

From the above description, it will be apparent that when the shaft 48 is rotated in the proper direction, the chains 46 will be tensioned, the upper ends of the levers 39 will be pulled toward each other thereby placing the chains 44 under tension and pulling the collars 35 inwardly against the tension of the springs 37. This movement of the collars 35 causes the brake shoes 30 to be set against the peripheries of the load supporting wheels 27. It will, of course, be understood that the lugs 33 fit in the grooves 34 with sufficient looseness or play to permit the inward movement of the collars without binding upon these lugs. The purpose of the elongated bearing slots 49 is to permit equalization of the tension upon the two chains 46.

The lug 51 projects outwardly from each side of the end portion of the axle just above each chain 44 to prevent these chains from twisting about the end portions of the axle.

From the above description, it will be seen that it is immaterial which sides of the load supporting beams are turned upwardly, as the brake mechanism will operate just as well with the beams in one position as in another. If during the operation of a vehicle equipped with my brake mechanism one or more of the track chains and the wheels supported thereby encounters an obstruction or a depression, such as a ditch, and turns over the hubs 36 will merely rotate in the collars 35 without in any way preventing future operation of the brake mechanism.

In the embodiment of my invention illustrated in Figures 6, 7 and 8, the brake mechanism is similar to that shown in Figures 1 to 5 inclusive, except that it is adapted to be used upon vehicles having straight main axles.

In this embodiment of my invention, the end castings 52 of the axle are provided with angular seats 53 for receiving the side members 23 of the load supporting frame. The inner ends of the castings 52 are provided with transversely extending bearing bosses 42' carrying the pintles 41' upon which the bearings 40'' of the levers 39' are mounted. The lever 39' is bifurcated as shown in Figure 8, one of the bifurcations 39'' being shorter than the other, and these two bifurcations extend upwardly on opposite sides of the axle 20'. The pins 43' carried by the two bifurcations of the lever 39' provide means for securing the inner ends of the chains 44'.

The remaining portions of the brake mechanism illustrated in this embodiment of my invention are similar to those shown in Figures 1 to 5 inclusive, and the mode of operation is exactly the same.

Figures 9 to 11 inclusive illustrate a slightly different embodiment of my invention, in which the brake shoes 30' are provided with spaced inwardly projecting lugs 30$^a$, which extend over the top and bottom sides of the load supporting beams 26, and are pivotally mounted thereon by means of the pintles 31' which extend through the load supporting beams.

A pair of lugs 60 project inwardly from the upper end of one of the shoes carried by each load supporting beam. Each pair of lugs carries a pintle 61 for supporting the bearing 62 of the lever 63, this bearing being located between the lugs 60. A single lug 64 projects inwardly from each of the other brake shoes and carries a pintle 65 which passes through the bifurcations 66 on one end of the link 67. At its other end, the link 67 is provided with a bearing 68, which extends between two bearing lugs 69 formed intermediate the ends of the lever 63, and is secured thereto by means of the pintle 70. As shown in Figure 11, the levers 63 incline upwardly from their pivot points. A cable 71, shown as comprising a chain, connects the outer or free ends of the levers 63. The central portion of the cable 71 passes through an eye or guide 72 carried by the transverse frame member 73. A second cable 74 has its ends connected with the chain 71, at points intermediate the guide 72, and the ends of the levers 63, and a third cable 75 is attached to the central portion of the cable 74 and extends toward the rear end of the vehicle. The outer end of this cable is provided with means, such for instance as a lever 76, for placing it under tension.

If one of the load supporting beams in the construction described above should become reversed in position, that is, if the bottom side should be turned upwardly, the outer ends of the cable 71 will wrap around the projecting ends of the axle.

To prevent breakage or other damage under such circumstances, I prefer to insert a compression or tension spring 77 in the cable 75, which is capable of sufficient compression or extension as the case may be to permit such twisting of the cable 71 without damage to the apparatus. This spring will, of course, have to be stiff enough to absorb all the tension placed on the cable 75 under normal operation.

Leaf springs 80 secured to the brake shoes, and having their ends pressing against the adjacent sides of the load supporting beams, provide means for releasing the brakes when the cable 71 is slacked.

In the embodiment of my invention hereinbefore described, I have provided braking means which operate upon only one wheel of each pair carried by the ends of the load supporting beams. Under some conditions of operation, it may be desirable to provide braking means for both wheels of each pair, and in Figures 12, 13 and 14 I have shown means for accomplishing this result. In the embodiment shown in Figures 12 and 13, a pair of shafts 81 extend transversely through each load supporting beam on each side of the shaft or the axle 20', and project from each side of the load supporting beam. A brake shoe 30' is secured to each projecting end of each shaft 81 by means of a key 82 or in any other suitable manner, and is positioned so that it can be swung in a vertical plane against the periphery of the adjacent load supporting wheel. One of the inner shoes on each load supporting beam is provided with a pair of spaced inwardly projecting lugs 60', upon which is received the bearing 62' of the toggle lever 63'. The other inner shoe is provided with an inwardly extending lug or bearing block 64' to which is pivotally secured one end of the link 67' by means of the pintle 65'. The opposite end of the link 67' is bifurcated and secured to a lug or bearing block 69' extending from the bearing 62' by means of the pintle 70'. The lug 69' fits loosely between the bifurcations of the link 67', and the pintle 70' passes loosely through the openings designed to receive it so as to provide the necessary universal movement between the link 67' and the bearing 62' to permit the necessary movements of these parts.

The opposite ends of a cable 74' having a considerable amount of slack are secured to the free ends of the levers 63' and a second cable 75' has one end secured to the center point of the cable 74'. The other end of the cable 75' may be tensioned by any suitable means. I have illustrated these means in my present embodiment as comprising a shaft 90, which is rotatably mounted in suitable portions of the load supporting frame, and provided with a ratchet lever 91 by means of which it can be rotated in either direction and held in any of its adjusted positions. If the vehicle provided with the brake mechanism described above is to be operated under conditions where the positions of the load supporting beams are apt to be reversed, it will be advisable to insert a compression spring similar to that shown in Figure 9 in either the cable 74' or the cable 75' or provide some other suitable mechanism for performing the same function.

The embodiment of my invention shown in Figure 14 is similar to that shown in Figures 12 and 13, except that the pintles 61$^a$, 70$^a$ and 65$^a$ are horizontally positioned in place of vertically. Otherwise, the construction and mode of operation are substantially the same as the construction and mode of operation of the apparatus shown in Figures 12 and 13.

While I have described the details of construction of the preferred embodiments of my invention, it is to be clearly understood that my invention is not limited to these details of construction, but is capable of other adaptations and modifications within the scope of the appended claims.

Having thus described my invention, what I claim is:

1. The combination with a vehicle comprising a load supporting frame, an axle for supporting said frame, said axle having downwardly offset end portions, a beam rotatably mounted on each end of said axle, a wheel mounted on each end of each of said beams, and a track chain trained around the wheels on each beam, of a brake mechanism for the wheels on each beam comprising a brake shoe for each wheel pivotally mounted on said beam adjacent each wheel and oscillatable about an axis lying at an angle to the axis of said axle, a lever extending from each of said shoes toward said axle, a collar mounted on the adjacent end of said axle and having an annular groove for receiving the ends of said levers, a lever mounted on said axle, a cable connecting said collar with an intermediate portion of said lever, a second cable extending inwardly from the upper end of said lever, a shaft extending longitudinally of said frame and having the inner end of said second cable secured thereto, and means for rotating said shaft.

2. The combination with a vehicle comprising a load supporting frame, an axle for supporting said frame, said axle having downwardly offset end portions, a beam rotatably mounted on each end of said axle, a wheel mounted on each end of each of said beams, and a track chain trained around the the wheels on each beam, of a brake mechanism for the wheels on each beam comprising a brake shoe for each wheel pivotally mounted on said beam adjacent each wheel, a lever extending from each of said shoes toward said axle, a collar mounted on the adjacent end of said axle and having an annular groove for receiving the ends of said levers, a lever mounted on said axle, and a cable connecting said collar with an intermediate portion of said lever, a second cable extending inwardly from the free end of said second lever, a shaft extending longitudinally of said frame and having the inner end of said second cable secured thereto, and means for rotating said shaft.

3. The combination with a vehicle comprising a load supporting frame, an axle for supporting said frame, said axle having downwardly offset end portions, a beam rotatably mounted on each end of said axle, a wheel mounted on each end of each of said beams, and a track chain trained around the wheels on each beam, of a brake mechanism for the wheels on each beam comprising a brake shoe for each wheel pivotally mounted on said beam adjacent each wheel, a lever extending from each of said shoes toward said axle, a collar mounted on the adjacent end of said axle and having an annular groove for receiving the ends of said levers, a lever mounted on said axle, and means connecting said collar with said second lever, means for actuating said second lever.

4. The combination with a vehicle comprising a load supporting frame, an axle for supporting said frame, a beam rotatably mounted on each end of said axle, a wheel mounted on each end of each of said beams, and a track chain trained around the wheels on each beam, of a brake mechanism for the wheels on each beam comprising a brake shoe for each wheel pivotally mounted on each beam adjacent each wheel, a lever extending from each of said shoes toward said axle, a collar mounted on the adjacent end of said axle and having an annular groove for receiving the ends of said levers, a second lever mounted on said axle, and means connecting said collar with said second lever, and means for actuating said second lever.

5. The combination with a vehicle comprising a load supporting frame, an axle for supporting said frame, a beam rotatably mounted on each end of said axle, a wheel mounted on each end of each of said beams, and a track chain trained around the wheels on each beam, of a brake mechanism for the wheels on each beam comprising a brake shoe for each wheel pivotally mounted on each beam adjacent each wheel, a lever extending from each of said shoes, and means comprising an element co-axial with said axle for actuating said levers to set said shoes.

6. The combination with a vehicle comprising a load supporting frame, an axle for supporting said frame, a beam rotatably mounted on each end of said axle, a wheel mounted on each end of each of said beams, and a track chain trained around the wheels on each beam, of a brake mechanism for the wheels on each beam comprising a brake shoe for each wheel pivotally mounted on each beam adjacent each wheel, and means for setting said shoes against said wheels comprising means permitting the complete rotation of said beam.

7. The combination with a vehicle comprising a load supporting frame, an axle for supporting said frame, a beam rotatably mounted on each end of said axle, a wheel mounted on each end of said beams, and a track chain trained aroaund the wheels on each beam, of a brake mechanism for the wheels on each beam, comprising a brake shoe for each wheel pivotally mounted on each beam adjacent the wheel, and a common actuator for applying all of the shoes, including an equalizing mechanism effective between the shoes on one beam and the shoes on the other beam.

8. The combination with a vehicle comprising a load supporting frame, an axle for supporting said frame, a beam rotatably mounted on each end of said axle, a wheel mounted on each end of each of said beams, a track chain trained around the wheels on each beam, a brake shoe pivotally mounted on each beam, and means for setting said shoes against the adjacent wheels, said means being operable independently of the position of said beam.

9. The combination with a vehicle comprising a load supporting frame, an axle for supporting said frame, a beam rotatably mounted on each end of said axle, a wheel mounted on each end of each of said beams, a track chain trained around the wheels on each beam, a brake shoe pivotally mounted on each beam, and an actuator for setting all of the shoes against their adjacent wheels, said actuator including an equalizing mechanism effective between the shoes on one beam and the shoes on the other beam.

10. The combination with a vehicle comprising a load supporting frame, an axle for supporting said frame, a beam mounted on each end of said axle, wheels for supporting said beams, track chains for supporting said wheels, brake mechanism for one of said wheels mounted on said beams and brake operating mechanism operable in part coaxially with said axle.

11. The combination with a vehicle comprising a load supporting frame, an axle for supporting said frame, said axle having downwardly offset end portions, a beam mounted on each end portion, a brake shoe pivotally mounted on each beam, a lever mounted near each end of said axle and connected with the adjacent brake shoe, said lever projecting upwardly, and means mounted on said axle for actuating said lever.

12. The combination of a vehicle having a load supporting axle, a beam pivotally mounted on each end of the axle, a wheel at each end of each beam, of a brake shoe for each wheel carried in opposed pairs by the beams, an actuator common to the brake shoes on each beam, and having elements thereof directly connected with said brake shoes and operating mechanism for simultaneously operating both actuators to apply and release all of the brakes simultaneously.

13. The combination with a vehicle comprising a load supporting frame, an axle for supporting said frame, a beam mounted on each end of said axle, and a pair of wheels mounted on each end of each beam, of a pair of brake shoes for each pair of wheels, the brake shoes on each beam being pivotally mounted on said beam between the two pairs of wheels supporting said beam to rotate about axes parallel to the axis of said axle, a connecting mechanism for actuating opposed brake shoes, said mechanism each comprising a lever extending substantially perpendicular to said beams, a cable connecting said levers, and means for tensioning said cable.

14. The combination with a vehicle comprising a load supporting frame, an axle for supporting said frame, a beam mounted on each end of said axle, and a pair of wheels mounted on each end of each beam, of a pair of brake shoes for each pair of wheels, the brake shoes on each beam being pivotally mounted on said beam to rotate about axes parallel to the axis of said axle, a connecting mechanism for actuating opposed brake shoes, said mechanisms each comprising a lever, a cable connecting said levers, and means for tensioning said cable.

15. The combination of a vehicle having a load supporting axle, a beam pivotally mounted on each end of the axle and a pair of wheels mounted on each beam, of a pair of opposed brake shoes carried by each beam for the two wheels thereon, a pair of brake shoe actuators each operating the two shoes on one beam, each of said actuators having elements thereof directly connected with the brake shoes of the adjacent pair of wheels, an operator for effecting the action of the actuator, and means for equalizing the force applied by the operator to the actuators.

16. Brake mechanism for a vehicle having a load supporting axle, a beam pivoted to each end of the axle and a pair of wheels for each beam, and comprising brake shoes carried in pairs by each beam for engaging the wheels thereof, an actuator adjacent each end of the axle and operable longitudinally and coaxially thereof to apply and release both brake shoes at the corresponding end of the axle, and an operator common to both actuators to operate the same and apply and release all of the brake shoes simultaneously.

17. A brake for a vehicle which has an axle and a pair of wheels at each end of the axle, comprising a brake shoe movable into and out of braking relation with one of the wheels, means journalled on the vehicle axle and cooperating with the brake shoe to actuate the same, and an actuator for said means.

18. A brake for a vehicle which has an axle and a pair of wheels at each end of the axle, comprising a brake shoe for retarding the rotation of a wheel, a collar journalled on the axle and movable longitudinally thereof to actuate the brake shoe, and means for moving the collar.

19. The combination with a vehicle having an axle and a pair of supporting wheels adjacent each end thereof, of a brake comprising a brake shoe for applying friction to a wheel, an operating mechanism for the brake shoe rotatable relative to the axle so as to be operative in any position of the axle, and means for actuating said mechanism.

20. Brake mechanism for a vehicle having load supporting axle, a beam pivoted to each end of the axle, a pair of wheels for each beam, and an endless tread chain passing about and between the wheels associated with each beam, and comprising a brake shoe for each wheel, said shoes being mounted in pairs upon the beams to engage both wheels associated with each beam, an actuator at each end of the axle and common to both brake shoes at the corresponding end of the axle, an operating handle, and equalizing connections between the handle and the actuators whereby the operation of the handle will apply and release all of the brake shoes simultaneously and the force applied to the handle will be equalized upon the actuators.

In witness whereof, I hereunto subscribe my name this 30th day of December, 1922.

ISAAC H. ATHEY.